Figure 1:
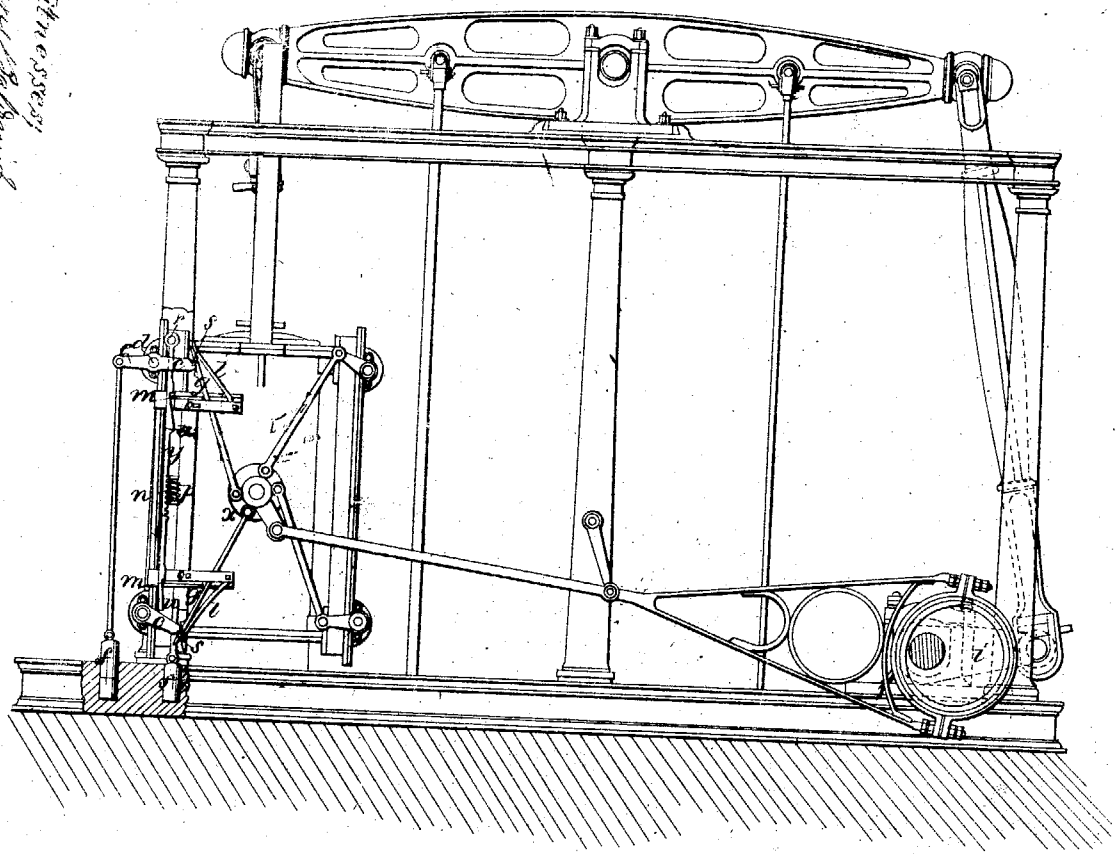

G. H. Corliss, 2 Sheets-Sheet 1.

Steam-Engine Valve-Gear.

No. 780. Reissued July 26, 1859.

Witnesses:
Henry Baldwin
W. A. Johnson

Inventor
George H. Corliss

2 Sheets-Sheet 2.
G. H. Corliss,
Steam-Engine Valve-Gear.
No. 780. Reissued July 26, 1859.
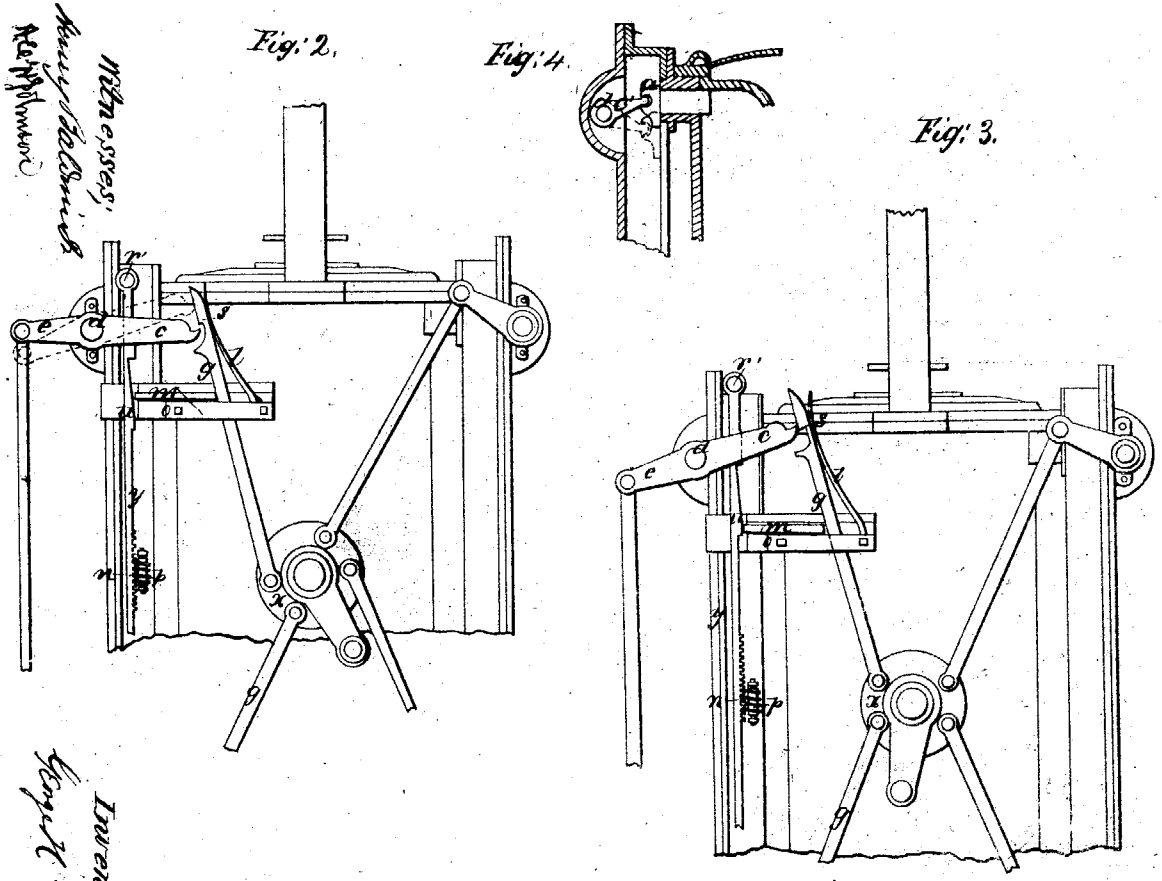
Witnesses,
Henry Baldwin Jr.
Alex. H. Johnson
Inventor,
George H. Corliss

UNITED STATES PATENT OFFICE.

GEORGE H. CORLISS, OF PROVIDENCE, RHODE ISLAND.

IMPROVEMENT IN CUT-OFF GEAR.

Specification forming part of Letters Patent No. 8,253, dated July 29, 1851; Reissue No. 780, dated July 26, 1859.

*To all whom it may concern:*

Be it known that I, GEORGE H. CORLISS, of the city and county of Providence, in the State of Rhode Island, have invented certain new and useful Improvements in the Method of Actuating Variable Cut-Off Valves of Steam-Engines, of which the following is a full, clear, and exact description, reference being had to the accompanying drawings, making part of this specification, in which—

Figure 1 represents a side elevation of a beam-engine with my valve-gear applied thereto. Figs. 2 and 3 are fragmentary side elevations of the steam cylinder and valve-gear, and Fig. 4 is a section of one of the valve-chests and the parts adjacent thereto.

In my said invention the valves are connected with and operated by rocking levers or their equivalents, by any suitable mode of connection, and these levers are operated in one direction, during the closing of the valves, either by their gravity, by weights connected therewith, or any other suitable means to insure the rapid closing of the ports, and in the opposite direction, to open the valves, by means of two shoulders each mounted upon the surface of a spring-bar or its equivalent, the latter having a positive longitudinal motion derived from an eccentric or other suitable part of the engine. Each of said shoulders, with the portion of the spring-bar to which it is attached, is free to move toward and from the axis of the rocking lever which it actuates, to admit of adjustment to liberate the valve at any required period of the stroke of the piston. This part of my invention consists in combining with the levers that operate the valves the shoulders on the spring-bars, the said shoulders being borne toward the axis of the levers by the force of gravity or springs; and my invention also consists in regulating the periods of closing the valves, by means of stops or gage-bars, which are adjustable by a governor or other means, when combined with the shoulders on the spring-bars to regulate their position, and thereby determine the periods of liberating the valves, that they may be closed by gravity or other equivalent means, while the periods of opening the valves remain unchanged.

In the accompanying drawings, *a*, Fig. 4, represents a slide-valve connected by an arm, *c'*, with an arbor, *d*, having an arm, *e*, Fig. 1, from which a weight, *f*, is suspended to close the valve when the rocking lever *c* is liberated. Within the extremities of the rocking levers for the two valves are bars *g g*, which receive a positive longitudinal motion from a plate, *x*, which is actuated by an eccentric, *i*, and on each of these bars a shoulder, *s*, is raised, which comes in contact with the extremity of the rocking lever *c*, when the latter is to be moved to open the valve, and as each bar is hinged at one end to the plate *x*, the other end is free to move transversely to the axis of the cylinder, and is borne outward by a spring, *l*, toward a stop or gage-bar, *m*, fitted to slide in the standard *o*, where it may be held at any point of adjustment by means of a wedge-formed block, *u*.

It will be seen by inspection of the drawings that as the spring-bars are moved longitudinally in contact with the gage-bars, the outer edge of the shoulders which actuate the rocking levers are moved in lines which cross the lines described by the extremities of the rocking levers, and the shoulders are thus drawn out of the path of movement of the rocking levers, and as they are made to traverse in different lines of movement corresponding with every change in the position of the gage-bars the periods at which the liberation of the valves will be effected will be correspondingly changed.

The blocks *u u* for the two valves are secured to a sliding rod, *y*, and the latter may be connected with the governor at *r'*, to determine by the velocity of the engine the position of the gage-bars, and hence determine the distance to which the shoulders on the spring-bars may be forced outward by the springs, which will determine the period of closing the valves, and when this valve apparatus is thus combined with the governor, the mode of regulation patented by me March 10, 1849, will be embodied. In the present instance the sliding rod *y* is represented as moved through the intervention of a rack, *n*, and worm *p*. This is intended for hand-adjustment. The rack and worm are dispensed with when the governor is applied.

Now, it will be seen that by the motion of the spring-bars the two shoulders always act upon the rocking levers to open the valves at the same period of the stroke of the piston;

but the periods when the shoulders shall liberate the rocking levers to permit the valves to be closed depends upon the lateral movement of the shoulders in the direction of the gage-bars—that is, the more the lateral movement of the shoulders on the spring bars is restricted by the gage-bars the sooner the rocking levers will be liberated, and vice versa; and, therefore, by simply varying the position of the gage-bars the periods of closing the valves can be changed, while the period of opening them remains the same.

I do not wish to be understood as limiting myself to the special construction and arrangement of the several parts, but to cover all merely formal variations.

What I claim as my invention, and desire to secure by Letters Patent, is—

1. Combining with the rocking levers or their equivalents for operating the valves the shoulders on the spring-bars, or their equivalents, substantially as described, and for the purpose specified.

2. In combination with the shoulders on the spring-bars that operate the rocking levers, substantially as described, the employment of the gage-bars or any equivalent therefor, to regulate the periods of closing the valves, whether the said gage-bars be regulated by a governor or by other means, as set forth.

In testimony whereof I have hereunto subscribed my name.

GEORGE H. CORLISS.

Witnesses:
HENRY BALDWIN, Jr.,
JOHN S. HOLLINGSHEAD.